United States Patent [19]

Watanabe et al.

[11] 4,130,438

[45] Dec. 19, 1978

[54] BASIC COMPOSITE UNBURNED BRICK

[75] Inventors: Akira Watanabe, Okayama; Yukio Kusaka; Yoshihiro Suzuki, both of Bizen, all of Japan

[73] Assignee: Kyushu Taikarenga Kabushiki Kaisha, Bizen, Japan

[21] Appl. No.: 854,497

[22] Filed: Nov. 23, 1977

[30] Foreign Application Priority Data

Dec. 11, 1976 [JP] Japan .................................. 51-149280

[51] Int. Cl.$^2$ ............................................. C04B 35/52
[52] U.S. Cl. .......................................... 106/56; 106/58
[58] Field of Search ..................... 106/56, 58; 428/408

[56] References Cited

U.S. PATENT DOCUMENTS

| | | | |
|---|---|---|---|
| 1,674,961 | 6/1928 | Diamond | 106/56 |
| 2,688,562 | 9/1954 | West et al. | 106/56 |
| 4,049,461 | 9/1977 | Morth et al. | 106/56 |

*Primary Examiner*—James Poer
*Attorney, Agent, or Firm*—Wenderoth, Lind & Ponack

[57] ABSTRACT

A composite brick is proposed which is produced by integrally molding two kinds of bodies, a magnesia-carbonaceous refractory and a basic refractory. These two bodies are put into respective positions in a metal case partitioned by a plate and subjected to pressure molding into a compact brick unit. This composite brick is much less expensive than the conventional high-purity magnesia-carbonaceous bricks. This means a substantial saving in the manufacturing cost of a furnace.

4 Claims, 5 Drawing Figures

BASIC COMPOSITE UNBURNED BRICK

BACKGROUND OF THE INVENTION

The present invention relates to basic composite unburned bricks produced by integrally molding magnesia-carbonaceous refractory and basic refractory.

In modern electric arc furnaces, fire bricks, particularly the ones at hot spots, are susceptible to damage by heat or melting due to intense heat associated with the high-voltage operation now established wth the development of operation technique. As a countermeasure to this problem magnesia-carbonaceous bricks had been used with successful results. However, the process for operating electric arc furnaces has recently developed further into the ultra-high-voltage operation. This has required the use of expensive high-purity magnesia-carbonaceous bricks at hot spots or slag line instead of the conventional magnesia-carbonaceous bricks. Generally, areas where bricks have got damaged by heat are dismantled and re-built with new bricks. This means a considerable waste of expensive high-purity magnesia-carbonaceous bricks.

One method to cope with this problem is to use shorter bricks than the conventional ones. In this case, however, it is necessary to arrange the shorter bricks so as to project inwardly of the furnace and to fill the space between the furnace shell and the bricks with powdery magnesia. This requires very complicated process and much skill. Another method is to arrange such short bricks without any spacing from the furnace shell. However, this leaves the bottom of the water-cooling jacket exposed, resulting in water leakage therefrom.

The Japanese utility model publication SHO 44-28136 discloses basic bricks having a hollow formed therein by molding a brick with a filler metal embedded therein and removing it after molding. However, this molding process was troublesome and time-consuming. The publication also describes that for use at areas exposed to severe damage, such a hollow may be filled with magnesia clinker. In this case, however, the clinker is merely filled, not compacted by pressure molding. Such bricks would be of no practical use under the modern stringent working conditions.

BRIEF SUMMARY OF INVENTION

An object of the present invention is to provide basic composite unburned bricks which are less expensive than the conventional high-purity magnesia-carbonaceous bricks.

The present invention consists in basic composite unburned bricks produced by integrally molding a magnesia-carbonaceous refractory portion on the furnace inside and a basic refractory portion on the shell side and covering the bricks with metal plates.

Other features and objects of the present invention will become apparent from the following description with reference to the accompanying drawings:

DETAILED DESCRIPTION

Figure 1:
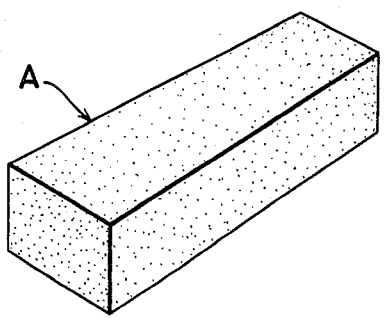
FIG. 1 is a perspective view of a conventional high-purity magnesia-carbonaceous brick with metal plates removed.
Figure 2:
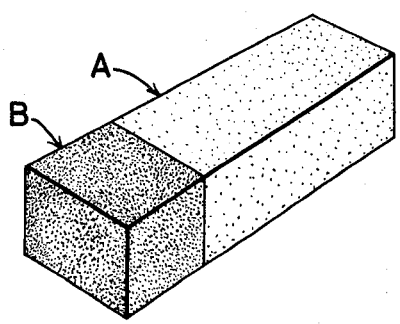
FIG. 2 is a similar view of a composite brick according to this invention.

In FIG. 1 there is shown a conventional high-purity magnesia-carbonaceous brick comprised of only magnesia-carbonaceous refractory designated as A. FIG. 2 shows a composite brick according to this invention comprising magnesia-carbonaceous refractory A and basic refractory, designated as B, integrally molded therewith. When in use, the former is placed facing inside of the furnace and the latter at the furnace shell side.

The magnesia-carbonaceous refractory A is a mixture of one or more magnesia materials, such as electrocast magnesia clinker and sintered magnesia clinker, and one or more carbonaceous materials, such as natural graphite, scrapped electrode, foundry coke, carbon black and pitch coke.

The ratio of magnesia to carbonaceous materials is not limited, but, preferably, the former may be 10-99% by weight and the latter 90-1% by weight. If the bricks are intended for use at the lower part of hot spots where they may come into contact with molten steel, the magnesia is preferably 45-99% and, more preferably 70-95%, and the carbonaceous material is preferably 55-1%, more preferably 30-5%. For use at the upper part of hot spots or adjacent the water cooling jacket, the former is preferably 10-55% and the latter is 90-45%.

The magnesia-carbonaceous body A used in this invention may be made by mixing magnesia and carbonaceous materials adjusted beforehand to a suitable grain size, adding one or more kinds of liquid or powdery carbonaceous binder to the mixture, and mixing them in a mixer at ordinary temperature or heating them at a suitable temperature.

The binder for the magnesia-carbonaceous mixture used in this invention is preferably heat-curing and serves to produce carbonaceous material by pyrolysis or thermal condensation polymerization. As such binders, pitch, anthracene, coal tar, other tars such as residue after pyrolysis of petrol, and resins such as phenol and furan resins may be used. The binders may be either liquid ones such as those mentioned above or powdery ones containing a relatively great amount of residual carbon. For example, resinous pitch obtained by heat treatment of tar produced by pyrolysis of crude oil is preferable.

As the material for the basic refractory B at the furnace shell side, sintered magnesia clinker, magnesia-chrome materials, chromite, magnesia-dolomite materials, dolomite, or scrapped basic brick may be used. Among them, materials containing magnesia are preferable. One or more binders, such as bittern, phosphate, phenol resin, tar, pitch and asphalt, are added to the basic material adjusted to a suitable grain size and are kneaded to obtain a basic body B.

Figure 3:
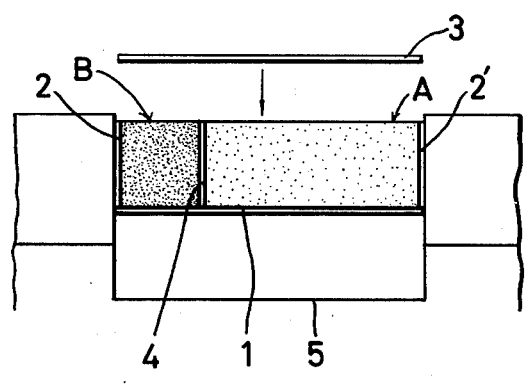
FIG. 3 is an illustration showing the molding process used to produce the composite bricks.

The process for molding the composite bricks according to this invention will be described below. Two kinds of bodies, magnesia-carbonaceous refractory A and basic refractory B, are put into respective positions in a metal case including a metallic mold 5, a bottom metal plate 1, side metal plates 2 and 2' and a partitioning plate 4, as illustrated in FIG. 3. The plate 4 is then removed and a top metal plate 3 is placed thereon. The entire composite body is subjected to pressure molding to obtain a composite brick having four sides covered with metal plates. Only after this pressure molding does it become a brick.

Figure 4:
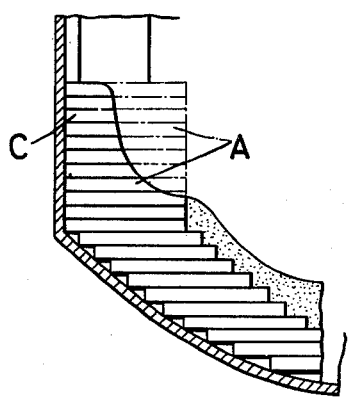
FIG. 4 is a partial side view of the furnace using the conventional bricks.
Figure 5:
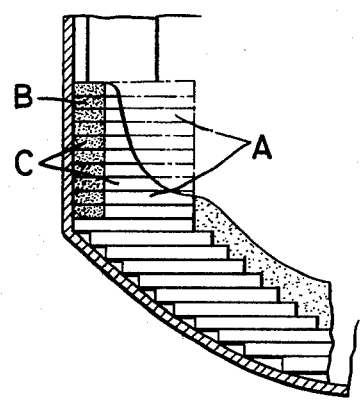
FIG. 5 is a similar view of the furnace using the composite bricks according to this invention.

The composite bricks according to this invention are used to build hot spots or slag lines of electric furnaces. They usually melt in such a manner as illustrated in FIG. 5. The remaining portion C has to be scrapped. Comparison with FIG. 4 showing a furnace using the conventional bricks indicates that the scrapped amount of the expensive magnesia-carbonaceous refractory A is much less than with the conventional furnace of this kind. This also means a substantial reduction in the manufacturing cost. This reduction is also achieved without any change in shape, size and working life of the brick.

Another advantage is that from exposure of the basic refractory B due to damage by heat it is easily known when a particular furnace wall should be re-built.

Conventional bricks are covered with a metal case at the rear thereof to prevent oxidation of carbon by action of air invading from the gap between the brick and the furnace shell by suction of a dust collector. The composite bricks according to this invention do not need such a metal case since they contain no carbon in the basic refractory disposed at rear thereof. This is a further advantage.

The material and size of the basic refractory B may vary according to the furnace size, operating conditions, extent of damage by heat, etc. Also, the number of sides covered with metal plates is preferably two or four, but may be one or three.

EXAMPLES

The following examples are included merely to aid in the understanding of the invention.

Different mixtures of aggregate materials and binders as listed in Table 1 were kneaded to obtain bodies A, A', A", A''' and B, B'. With the above-mentioned process, basic composite bricks were then prepared by integrally molding two kinds of bodies, A + B, A + B', A' + B, A" + B', and A''' + B, respectively. The size of bricks was 350 × 114~97 × 65 mm with refractory A 250 mm long and the refractory B 100 mm long.

Assuming that the manufacturing cost of the conventional bricks consisting of bodies A, A', A" or A''' only is 100, that of the composite bricks were as follows:

A + B 70
A + B' 65
A' + B 75
A" + B' 70
A" + B 74

Thus, the composite bricks according to this invention are by 25 to 35% less expensive than the conventional high-purity magnesia-carbonaceous bricks.

With the bricks using the bodies A', A" or A''' only, which have a carbon content of 40-90%, the furnace shell could become red hot in use because of high thermal conductivity. The composite bricks according to this invention eliminate such a possibility.

Table 1

| Components | Particle size (in mm) | A | A' | A" | A''' | B | B' |
|---|---|---|---|---|---|---|---|
| Aggregate | | | | | | | |
| Electrocast magnesia clinker | 5 ~ 1 | 50 | 30 | | | | |
| High-purity sintered magnesia clinker | 1 ~ 0.125 | 20 | | | | | |
| High-purity sintered magnesia clinker | < 0.125 | 20 | | | | | |
| Sintered magnesia clinker | 5 ~ 1 | | 50 | | 10 | 50 | |
| Sintered magnesia clinker | 1 ~ 0.125 | | 10 | | | 20 | |
| Sintered magnesia clinker | < 0.125 | | | | | 30 | |
| Scrapped magnesia-chrome brick | 5 ~ 1 | | | | | | 50 |
| Scrapped magnesia-chrome brick | 1 ~ 0.125 | | | | | | 20 |
| Scrapped magnesia-chrome brick | < 0.125 | | | | | | 30 |
| Scaly graphite | | 10 | 40 | 70 | 90 | | |
| Binder | | | | | | | |
| Resinous pitch | | }7 | 10 | 15 | 18 | | |
| Liquid pitch | | | | | | | |
| Bittern | | | | | | 3 | |
| Magnesium metaphosphate | | | | | | | 0.5 |

We claim:
1. A composite unburned brick comprising:
   a magnesia-carbonaceous refractory body portion; and
   a basic refractory body portion integrally molded to one side of magnesia-carbonaceous refractory body portion.
2. A composite unburned brick as claimed in claim 1 wherein said magnesia-carbonaceous refractory comprises at least one magnesia material and a carbonaceous material.
3. A composite unburned brick as claimed in claim 2 wherein the content of said magnesia material is 10–99 percent by weight and that of said carbonaceous material is 90–1 percent by weight.
4. A composite unburned brick as claimed in claim 1 wherein said brick has at least one side thereof covered with a metal plate.

* * * * *